Aug. 25, 1931.  A. ALLEN  1,820,521
FLOATING STORAGE AND MIXING BIN
Filed July 29, 1929   3 Sheets-Sheet 2

Inventor
ANDREWS ALLEN
By Barnett & Truman
Attorneys

Aug. 25, 1931.  A. ALLEN  1,820,521
FLOATING STORAGE AND MIXING BIN
Filed July 29, 1929  3 Sheets-Sheet 3
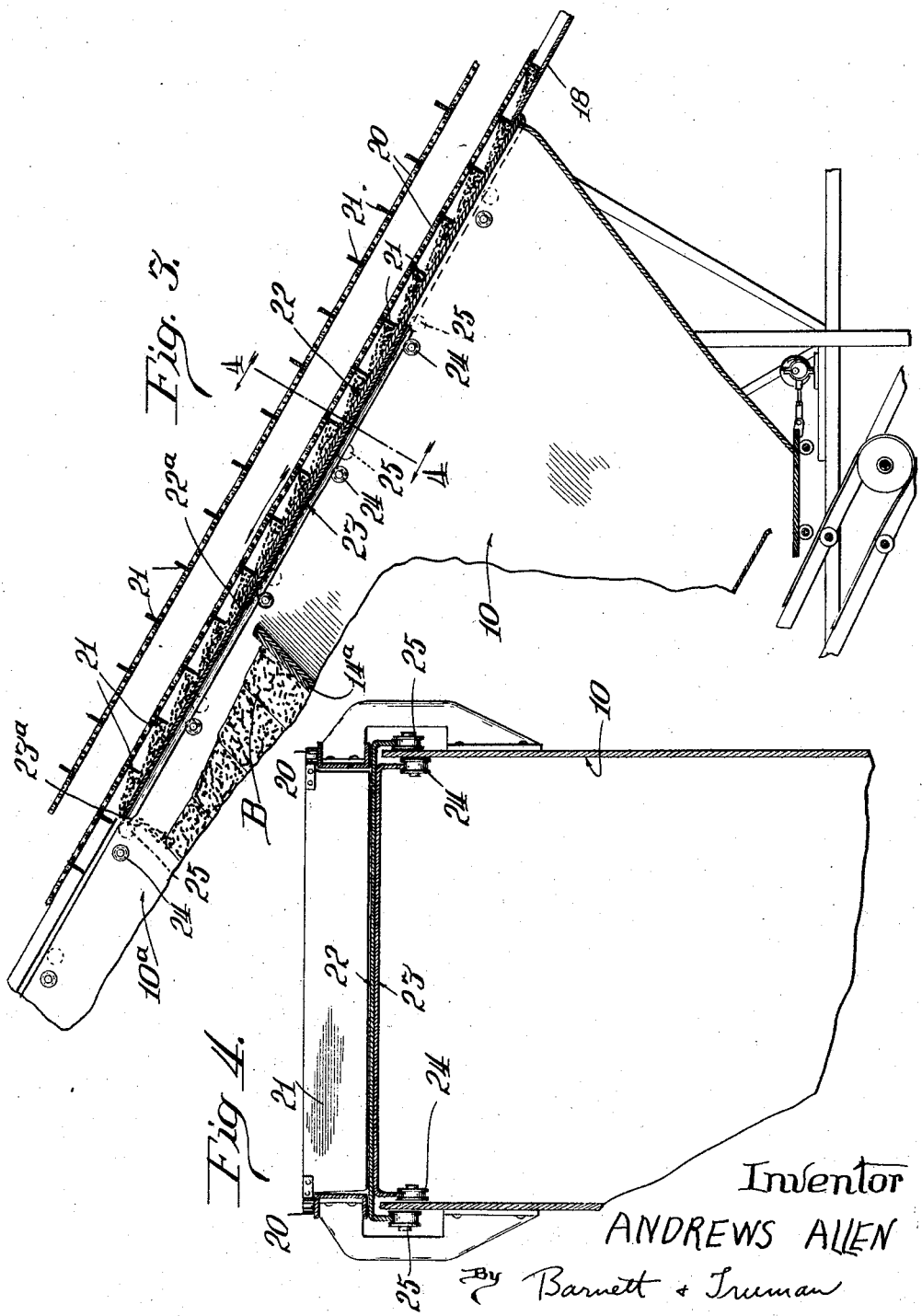
Inventor
ANDREWS ALLEN
By Barnett & Truman
Attorneys Patented Aug. 25, 1931

1,820,521

UNITED STATES PATENT OFFICE

ANDREWS ALLEN, OF GLENCOE, ILLINOIS, ASSIGNOR TO ALLEN & GARCIA COMPANY, OF CHICAGO, ILLINOIS, A CORPORATION OF ILLINOIS

FLOATING STORAGE AND MIXING BIN

Application filed July 29, 1929. Serial No. 381,784.

My invention relates to apparatus for storing and automatically mixing bulk materials. One of the principal objects of the invention is to provide improved means for handling and storing coal or other similar material.

When material, such as coal, is stored in the storage bins now in general use, the material is subjected to considerable breakage from handling, and particularly from dropping the material into the bin.

The principal object of the present invention is to provide an improved apparatus for handling and storing such material, whereby the material when fed into the storage bin will slide down an inclined wall thereof and build up an inclined layer of material over which the incoming material will flow without excessive breakage.

Another object is to provide an improved floating storage and mixing bin of sufficient capacity to take care of fluctuations in the quantity of material introduced whereby the volume of the mass may vary from time to time without affecting the supply of material at the discharge end of the bin,—that is to say, the side of the mass over which the incoming material flows may move toward or away from the discharge opening of the bin in accordance with the amount of material fed into the bin relative to the amount discharged therefrom.

Another object is to so bed the incoming material in the bin that it will be discharged in the form of an average mixture, regardless of the different qualities of material fed into the bin. In this connection I aim particularly to provide a floating storage and mixing bin which will meet the requirements of the various industries involving treatment or use of large quantities of material, such as coal or ore, where the material received by the said industry varies considerably in quality, but which for proper use or treatment, must be substantially uniform in quality.

It is, therefore, one of the specific objects of the present invention to provide an efficient method and apparatus for storing and automatically mixing bulk material of varying quality which will be capable of continuous operation and whereby the material will be uniformly mixed during the discharge from the storage bin.

According to the present invention, the storage bin is substantially rectangular in cross section and is so arranged that the end wall and the bottom of the bin incline at such angles that the material being stored will readily flow over the end wall and bottom of the bin in a direction toward the discharge opening. Preferably the height of the bin is such that a car lot of material when fed into the bin will form an inclined layer at one end of the bin, the said layer extending from the bottom to the top of the bin. The next car lot of material, when fed into the bin, will flow down the inclined side of the previous lot of material and form a second layer. This operation may be continued until the bin is entirely filled. The material is withdrawn from the bottom of the bin through a single discharge opening and, due to the inclined layers of the bedded material, the discharge flow of material is taken from a plurality of said inclined layers, thereby insuring a substantially uniform mixture.

The capacity of the bin is preferably such that one-half of the capacity is available to compensate for the fluctuation in the volume of material introduced into the bin relative to the volume of material discharged therefrom. The inclined bottom of the bin permits the body of material therein to move from any part of the bin toward the discharge opening, thereby insuring a uniform discharge of material as long as there is material in the bin.

A further specific object of the invention is to provide a bin and handling mechanism of predetermined capacity which may be constructed as a single unit, but which is capable of being used in series with other units so as to increase the capacity of the storage and mixing plant or when it is desired to blend radically different material, such for example, as coal of high and low volatile content or different sulphur content, etc. When a series of bins are used conjointly, I preferably, though not necessarily, employ a specially constructed conveyor provided with movable gates which may be conveniently operated to discharge material from the conveyor into any one of the several bins.

Fig. 3 is a fragmentary sectional view of two adjacent storage and mixing bins and illustrating a modified form of conveyor for conveying the material into the bins when the said bins are used in series, and Fig. 4 is a cross-sectional view taken on line 4—4 of Fig. 3, illustrating the general cross-sectional contour of the conveyor trough and the positions of the movable gate.

Figure 1:
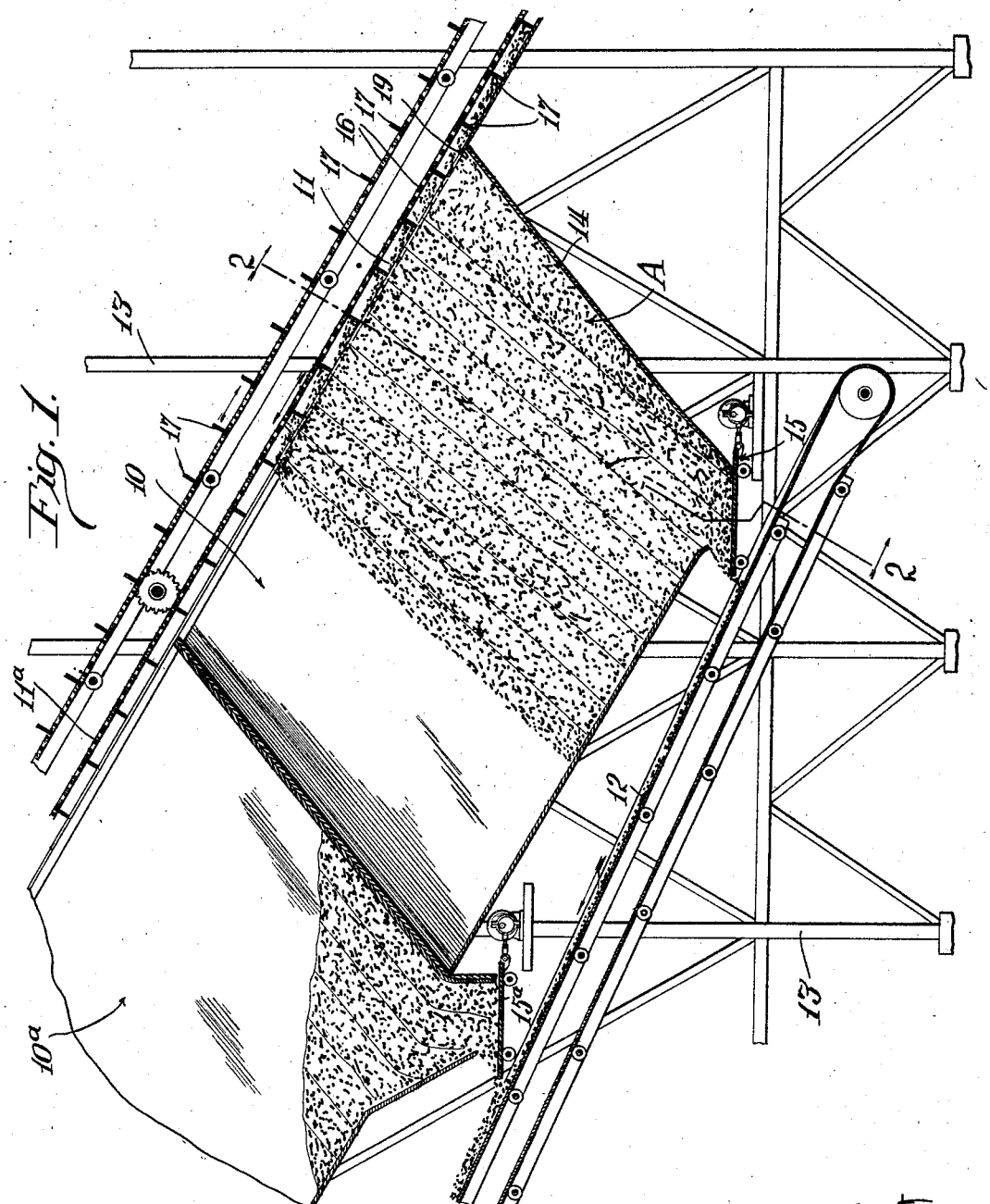
Fig. 1 is a sectional view taken through one storage and mixing unit constructed in accordance with my invention and illustrating also a fragmentary portion of a second unit which may or may not be used as conditions may demand.
Figure 2:
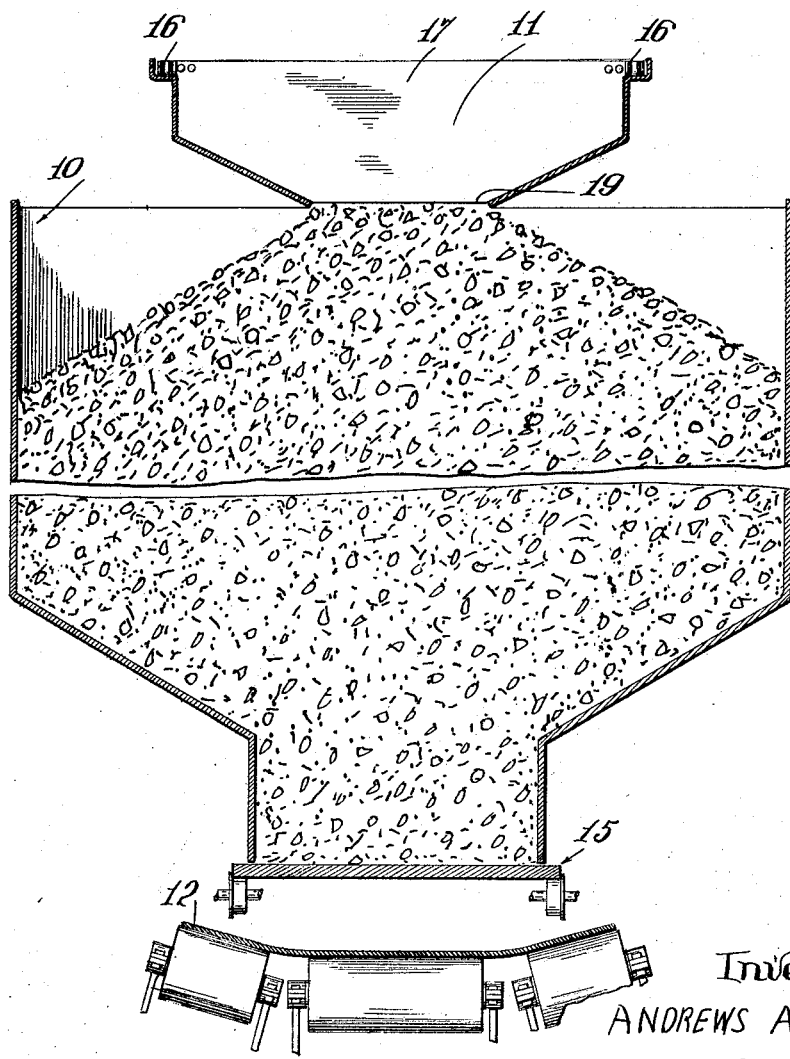
Fig. 2 is a cross-sectional view taken through the apparataus of Fig. 1, the section being taken on line 2—2 of Fig. 1.

Referring first to Figs. 1 and 2 of the drawings:

10 designates a storage and mixing bin, 11 a drag conveyor for feeding material into the bin, and 12 a conveyor for receiving the material discharged from the bin. The bin may be of any desired length and is supported by suitable supporting structures in a position whereby the end wall 14 of the bin inclines at an angle over which the material will slide when it is discharged from the conveyor 11 into the bin. The discharge opening of the bin is located preferably at the lower corner of the bin and is controlled by any suitable discharge mechanism. In the drawings, I have illustrated, diagrammatically, a reciprocating discharge mechanism 15 adapted to be reciprocated across the discharge opening of the bin in a manner to discharge measured quantities of material upon the belt conveyor 12. The conveyor 12 carries the material to the place of consumption or treatment, as the case may be.

By inspection of Fig. 1 of the drawings it will be seen that the first material fed into the bin will flow directly from the conveyor 11 to the discharge end of the bin. When the volume of incoming material exceeds the volume discharged from the bin, the surplus material builds up a layer designated in the drawings by the reference letter A along the end wall of the bin. This layer will be built up until the inclined side thereof corresponds to the angle of repose of the material on the same material. Preferably the discharging mechanism is not put into operation until a plurality of layers are built up in the bin. The thickness of the several layers will depend, of course, upon the height of the bin. Preferably the height of the bin is such that the usual carlot of coal will form one layer in the bin, the layer of material being of such thickness that the material discharged is drawn from a plurality of layers. With this method of bedding material in the bin and discharging it therefrom, materials of different quality, when bedded in the bin, will be automatically mixed at the discharge end of the bin so as to maintain a substantial uniform quality of material discharged from the bin onto the belt conveyor 12. The conveyor 11 is preferably of the drag type consisting of endless link belts 16 provided with flights 17 which move through a conveyor trough 18. The bottom of the trough 18 preferably slopes toward the center, as shown in Fig. 2, and the bottom or that portion of the trough extending over the bin, is open, so that the material will discharge through the open bottom of the trough into the bin. The sloping bottom of the trough makes it practicable to reduce the width of the opening 19 of the trough, and thereby minimize the power required to drag the incoming material over the top of the material in the bin. If the material in the bin is coal, the relatively narrow discharge opening 19 of the drag conveyor minimizes the amount of breakage, resulting from the dragging of the coal over the top of the pile in the bin.

In Fig. 1, I have illustrated the bin 10 approximately half filled with material. As the body of material is discharged from the discharge opening of the bin, the entire body of material, due to the inclined bottom of the bin, will tend to move slowly toward the discharge opening, thereby insuring an ample supply of material at the discharge opening of the bin at all times.

When it is desired to mix materials of different character or of radically different quality, the storing and mixing bins are arranged in series. In Fig. 1 I have shown a bin 10a arranged end to end with the bin designated 10 so that its discharge mechanism 15a will discharge a quantity of material from the bin 10a upon the belt conveyor 12. The quantities of material discharged from either of the bins may be accurately controlled by controlling the operation of the discharge mechanism 15 and 15a, respectively. Consequently the materials from the bins 10 and 10a may be accurately mixed with predetermined proportions. The bin 10a, as shown in Fig. 1, is fed by means of conveyor 11a arranged at one side of the conveyor 11.

In Fig. 3 I have illustrated a plurality of bins 10, 10a arranged in series, substantially as illustrated in Fig. 1, but as shown, in this connection, a modified construction of feed conveyor. In this embodiment of the invention a single conveyor supplies material to each of the bins 10—10a. The conveyor trough 18 is rectangular in cross section and may be of any desired width. An endless link belt 20 is provided with flights 21 corresponding to the contour of the conveyor trough 19 and are operated in the direction indicated by the arrow in Fig. 3, so as to drag the material through the trough 19 to the place of discharge. The bottom of that portion of the trough 19 extending over the bins 10—10a are provided with gates 22—23 adapted to be opened and closed by means of cables or other suitable operating mechanism. Preferably the gate 23 is arranged so as to operate beneath the gate 22 and each gate is supported on suitable rollers 24—25 journaled on the side of the bin or other suitable support. With this form of conveyor the material can be directed to either of the bins 10—10a without dragging the material over the top of the body of material in the bin. When it is desired to feed material into bin 10a of Fig. 3, the gate 23 is lowered to a position below the gate 22 and until the upper end 23a of the gate is substantially flush with the end wall 14a of the bin. The material will be discharged over the end 23a and slide down over the end wall 14a of the bin 10a to build up a layer of material designated B in Fig. 3. As the material is built up to the upper portion of the bin, the gate 23 may be gradually closed so as to discharge the material upon the inclined side of the pile at any point in the bin. When it is desired to discharge material into the bin 10, the gate 23 is drawn to its closed position and the gate 22 lowered until its upper end 22a assumes a position opposite the side of the body of material in the bin.

While I have described my invention in connection with two specific embodiments, it will be obvious to persons skilled in this art that various modified constructions can be produced without departing from the spirit of the invention. It will be understood, therefore, that I do not desire to limit the scope of the invention except insofar as such limitation is made necessary by the state of the prior art and by the expressed limitations appearing in the appended claims.

I claim:

1. An apparatus for automatically mixing material comprising a substantially rectangular storage bin positioned whereby the bottom and one end wall thereof incline at angles over which the body of material stored therein will move by gravity toward the lower corner of the bin, a conveyor for feeding quantities of material into the bin to form contiguous layers therein inclined from the bottom to the top of the bin in substantially parallel planes, and means at said lower corner of the bin for withdrawing the material simultaneously from a plurality of said layers of the material.

2. An apparatus for automatically mixing materials comprising a substantially rectangular storage bin supported in a position whereby the bottom and one end wall thereof incline at angles corresponding substantially to the angle of flow of material over said surfaces, a conveyor comprising a trough, the bottom of which slopes toward the center and having, in that portion of the bottom extending over the bin, a discharge opening extending substantially the length of the bin, means in said trough for imparting movement to the material in the direction of said discharge opening whereby the first lot of material introduced into the bin forms a layer upon said inclined end wall and the material subsequently introduced flows over the inclined side of the mass to build up successively layers of material inclined in substantially parallel planes and extending from the bottom to the top of the bin, said bin having a discharge opening at the junction of said end wall and bottom for discharging material simultaneously from a plurality of said inclined layers, and means for controlling the volume of material discharged.

3. An apparatus for storage of bulk material of variable volume and for automatically mixing same comprising a substantially rectangular storage bin supported in an angular position whereby the bottom and one end wall thereof incline at angles over which the material will flow by gravity, means for bedding a body of material in said bin comprising a trough positioned above the bin and having in that portion of the bottom extending over the bin, a discharge opening, means for moving material through said trough and discharging it upon the inclined wall and, as the body of material is built up in the bin to discharge the incoming material upon the inclined side of the mass of material whereby the mass of material is made up of a plurality of layers extending at the angle of repose of the material and which material moves bodily over the inclined bottom and side wall of the bin toward the lower corner of the bin, and means for withdrawing measured quantities of material from said bin at the junction of said end wall and bottom, whereby the material discharged is made up of portions taken from a plurality of said layers.

4. An apparatus for automatically mixing materials comprising a substantially rectangular storage bin supported in a position whereby the bottom and one end wall thereof incline at angles over which the material will flow by gravity, means for introducing material into the bin to form successively layers of material extending in substantially parallel planes from the bottom to the top of the bin comprising a conveyor trough positioned above the bin and having in that portion of the bottom extending over the bin a discharge opening extending substantially the length of the bin, means for moving the material through said trough and discharging it therefrom at the edge of the mass of material in said bin, and a closure for said discharge opening adapted to be moved longitudinally of the trough to shift the point of discharge from the trough longitudinally of the bin so as to discharge the material at the edge of the mass, and means for withdrawing the material from the mass at the bottom of the bin.

5. An apparatus for mixing materials comprising a plurality of storage bins arranged in series and positioned so that the bottom and one wall of each bin incline at angles over which the material will move by gravity, means for bedding material in each bin in layers inclining in substantially parallel planes from the bottom to the top of said bins comprising a trough extending across said bins and having a discharge opening in the bottom thereof substantially equal to the length of said bins, closures for said discharge opening adapted to be positioned whereby the material passing through said trough will discharge at selected locations in said bins, means for withdrawing material simultaneously from a plurality of layers of said bins, and means for receiving and assembling the material discharged from said bins.

ANDREWS ALLEN.